(12) United States Patent
Lapuh et al.

(10) Patent No.: US 8,098,656 B2
(45) Date of Patent: Jan. 17, 2012

(54) METHOD AND APPARATUS FOR IMPLEMENTING L2 VPNS ON AN IP NETWORK

(75) Inventors: Roger Lapuh, Uesslingen (CH); Mohnish Anumala, Littleton, MA (US)

(73) Assignee: Avaya, Inc., Basking Ridge, NJ (US)

( * ) Notice: Subject to any disclaimer, the term of this patent is extended or adjusted under 35 U.S.C. 154(b) by 399 days.

(21) Appl. No.: 12/492,548

(22) Filed: Jun. 26, 2009

(65) Prior Publication Data
US 2010/0329265 A1  Dec. 30, 2010

(51) Int. Cl.
*H04L 12/50* (2006.01)
*H04Q 11/00* (2006.01)

(52) U.S. Cl. ..................... 370/386; 370/395.1

(58) Field of Classification Search .......... 370/230, 370/231, 235, 351–354, 386, 389, 390, 392, 370/395, 400, 401, 409, 411, 428, 464–469, 370/474, 475; 709/218, 227, 229, 232, 236, 709/238
See application file for complete search history.

(56) References Cited

U.S. PATENT DOCUMENTS

| | | | | |
|---|---|---|---|---|
| 6,993,026 | B1 * | 1/2006 | Baum et al. | 370/392 |
| 7,327,675 | B1 * | 2/2008 | Goode | 370/230 |
| 7,630,310 | B2 * | 12/2009 | Bapat et al. | 370/231 |
| 7,724,732 | B2 * | 5/2010 | Guichard et al. | 370/389 |
| 7,830,787 | B1 * | 11/2010 | Wijnands et al. | 370/218 |
| 7,869,436 | B1 * | 1/2011 | Adler et al. | 370/392 |
| 2004/0017816 | A1 | 1/2004 | Ishwar et al. | |
| 2006/0126659 | A1 | 6/2006 | Baum et al. | |
| 2008/0095062 | A1 | 4/2008 | Shankar et al. | |
| 2008/0101239 | A1 * | 5/2008 | Goode | 370/235 |
| 2009/0116483 | A1 | 5/2009 | Anumala et al. | |

OTHER PUBLICATIONS

International Search Report from related PCT application PCT/US2010/039622.

* cited by examiner

*Primary Examiner* — Ayaz Sheikh
*Assistant Examiner* — Blanche Wong
(74) *Attorney, Agent, or Firm* — Anderson Gorecki & Manaras LLP

(57) ABSTRACT

MP-BGP VPN infrastructure based on IETF RFC 4364/2547 is used to configure a layer 2 VPN on an IP network. VRFs for the VPN are configured on Ethernet switches and service IP addresses are associated with each configured VRF. The service IP addresses are exchanged to enable VPN traffic to be encapsulated for transport over the IP network. To enable a L2 VPN to be established on the network, a VPN-VLAN ID will be configured for the L2 VPN and import/export route targets for the VPN-VLAN will be set in each VRF and UNI-VLAN that is part of the VPN. The VPN-VLAN will be announced to all PEs using MP-iBGP with export route targets set for this VPN-VLAN. The PE's control plane learns the VPN-VLAN on a logical port if the import RT matches the export RT received by the MP-iBGP control plane. Once the VPN-VLAN is learned on a logical port, the PE will perform MAC learning on that logical port and treat the logical port as if it were part of the L2 VLAN.

19 Claims, 4 Drawing Sheets

METHOD AND APPARATUS FOR IMPLEMENTING L2 VPNS ON AN IP NETWORK

CROSS-REFERENCE TO RELATED APPLICATIONS

This application is related to U.S. patent application Ser. No. 11/935,563, filed Nov. 6, 2007, entitled "Supporting BGP Based IP-VPN in a Routed Network", the content of which is hereby incorporated herein by reference.

TECHNICAL FIELD

The present invention relates to communication networks and, more particularly, to a method and apparatus for implementing layer 2 virtual private networks on an Internet Protocol Network.

BACKGROUND

Data communication networks may include various computers, servers, nodes, routers, switches, bridges, hubs, proxies, and other network devices coupled together and configured to pass data to one another. These devices will be referred to herein as "network elements." Data is communicated through the data communication network by passing protocol data units, such as data frames, packets, cells, or segments, between the network elements by utilizing one or more communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between network elements, various aspects of what the protocol data units should look like, how packets should be handled or routed through the network by the network elements, and how information associated with routing information should be exchanged between the network elements.

Enterprise consolidation and security considerations are drivers that demand that networks be virtualized. Virtualization of a network enables a virtual network to be created over the physical network so that traffic may be maintained private to the subset of users and nodes that form part of the virtual network. Layer 2 (i.e. Ethernet) Virtual Local Area Network (VLAN) and Layer 3 (Internet Protocol) based VPNs are functionalities that support network virtualization. There are many types of VPNs, such as MPLS based VPNs (established using IETF RFC 4364/2547), Virtual Private LAN Service (VPLS), Pseudowire, and IP-Security (IP-SEC) based VPNs. Other types of VPNs exist as well and this list is not intended to be exhaustive. While all of these VPNs have particular merit and applicability, each requires a special underlying infrastructure to support the VPN.

One common VPN technology is based on RFC 2547, which has now been superseded by IETF RFC 4364. This standard was developed to enable VPNs to be deployed on an MPLS network. VPNs based on this standard have been extensively deployed and thus the manner in which they operate is well known. Unfortunately, the MPLS infrastructure, which has its own signaling and control plane protocols, has proved expensive to implement and maintain. To alleviate some of the complication of this VPN solution, related U.S. patent application Ser. No. 11/935,563, filed Nov. 6, 2007, entitled "Supporting BGP Based IP-VPN in a Routed Network", proposed to use the VPN infrastructure of RFC 2547 in connection with IP encapsulation rather than in connection with an MPLS network. As described in that application, the basic manner in which the PE nodes create the Virtual Routing and Forwarding tables, i.e. import route target/export route target attributes remain the same. However, rather than advertising an MPLS service label, the nodes export an IP service address that is to be used to forward traffic on the IP network. Thus, the VPN solution is able to be used over any IP network and is not limited to use on an MPLS network. Since the basic infrastructure for this IP based VPN solution is based on FC 4364/2547 control plane concepts using MP-iBGP extensions, only the VPN end-points are required to support this functionality. The nodes in the middle of the IP network operate as normal IP routers and, hence, are agnostic to the fact that a VPN is being implemented.

This previous extension of RFC 2547/4364 enables a layer 3, i.e. IP layer, VPN to be built on an IP network. There are also instances where customers would like to have layer 2 VPN rather than a layer 3 VPN. Accordingly, it would be advantageous to provide a L2 VPN solution that is easy to deploy into existing networks and does not require an MPLS infrastructure.

SUMMARY OF THE INVENTION

MP-BGP VPN infrastructure based on IETF RFC 4364/2547 is used to configure a layer 2 VPN on an IP network. VRFs for the VPN are configured on Ethernet switches and service IP addresses are associated with each configured VRF. The service IP addresses are exchanged to enable VPN traffic to be addressed to be carried by the IP network. To enable a L2 VPN to be established on the network, a VPN-VLAN ID is configured for the L2 VPN and import/export route targets for the VPN-VLAN are set in each VRF that is part of the VPN. The VPN-VLAN is implemented on the network using a VPN-VLAN ID to establish a L2 broadcast domain. The VPN-VLAN ID is announced to all PEs using MP-iBGP with export route targets set for this VPN-VLAN. The PE's control plane learns the VPN-VLAN on a logical port if the import RT matches the export RT received by the MP-iBGP control plane. Once the VPN-VLAN ID is learned on a logical port, the PE will perform MAC learning within the VLAN on that logical port.

A PE that is part of the VPN VLAN may have local ports that connect to client networks, e.g. client local area networks. The term User to Network Interface is commonly used to refer to the demarcation point between a service provider network and a customer network. As used herein, the term UNI-VLAN will be used to refer to a customer VLAN that connects to a PE at a port on the PE. A UNI-VLAN will be assumed to be a layer 2 VLAN in the context of this application. A VPN-VLAN is a logical extension of a UNI-VLAN to other PE network elements over an intervening routed network. A VRF may connect to multiple UNI-VLANs and, similarly, may connect to multiple VPN-VLANs. The VRF maintains a mapping between UNI-VLANs and VPN-VLANs to enable the UNI-VLAN broadcast domain to extend via the VPN-VLAN across a routed network. IP encapsulation is then used to carry traffic across the routed network so that traffic within the L2 VPN may be carried by the network.

To handle data on the network, if an Ethernet frame is received at a PE with an unknown MAC address, the frame will be flooded to all local UNI VLAN ports that are part of the VPN and also flooded to all remote VPN instances (logical interfaces) through the VPN-VLAN. If the destination MAC is known and resides within an attached UNI-VLAN, the frame will be transmitted out the port connecting to the UNI-VLAN. If the destination MAC address is known and resides on the VPN-VLAN (i.e. resides on a remote PE), the PE will read the MAC address to determine the logical port (VPN-VLAN ID and service IP address of the remote VRF) for forwarding on the VPN-VLAN. The Ethernet frame will then be tagged with a Q-tag containing the VPN-VLAN ID and encapsulated into an IP packet to be transported on the IP network.

When a VPN-VLAN Mac-in-IP encapsulated packet is received on the IP network on the remote PE, the destination IP address of the outer IP header will be used to determine the target VRF that should process the packet (the destination IP address of the packet is the service address of the VRF). The VRF will read the Q-tag of the inner Ethernet packet to identify the VPN-VLAN, and the destination MAC address of the user section of the encapsulated Ethernet packet will be used to determine, from a local forwarding table, the output port for the packet. If the destination MAC address is unknown, the frame will be flooded out all UNI ports associated with the VPN-VLAN and the UNI VLAN.

If an endpoint wants to participate in the L2 VPN, it imports/exports the VPN-VLAN ID route target for the L2 VPN. Packets are forwarded in the VPN by adding an 802.1Q tag header including the VPN-VLAN ID to the customer frame and then encapsulating the customer Ethernet frame with an IP header. If the customer frame is not previously tagged, the tagging process adds a Q-tag according to IEEE 802.1Q. If the customer frame is already Q-tagged, this process either replaces the original Q-tag or adds a second Q-tag as provided by IEEE 802.1ad. Where the frame is a unicast frame, the frame will be IP encapsulated using the Service IP address of the destination VRF so that the frame can be sent to the service IP address of the destination VRF over the IP network. If the frame is a multicast or broadcast frame, it may either be unicast multiple times or may be forwarded via IP multicast (where IP multicast is supported by the IP network) using an IP Multicast destination address header.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

A layer 2 Virtual Private Network (VPN) solution is described which relies on RFC 2547/4364 for signaling but in which IP encapsulation is used to carry VPN traffic on an IP backbone. This enables familiar VPN signaling to be used to set up the Layer 2 VPN without requiring the IP backbone to be implemented using an MPLS infrastructure. This is advantageous, since MPLS networks have their own signaling and control plane protocols and, hence, are more expensive to establish and maintain. Although MPLS has particular traffic engineering advantages that are considered desirable by service providers, in Enterprise networks the traffic engineering aspects are often not particularly relevant. Thus, a simpler to implement VPN solution may be particularly desirable in an Enterprise scenario where the Enterprise may establish VPNs of the same ilk as is often deployed on an MPLS network, without requiring the Enterprise network to run the MPLS signaling and control protocols.

Figure 1:
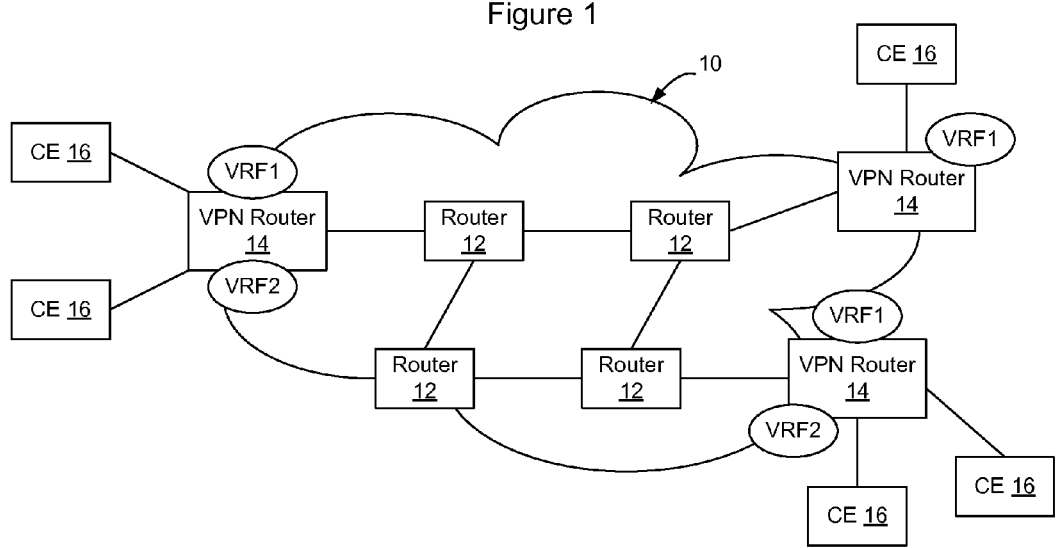
FIG. 1 is a functional block diagram of a reference network.
Figure 2:
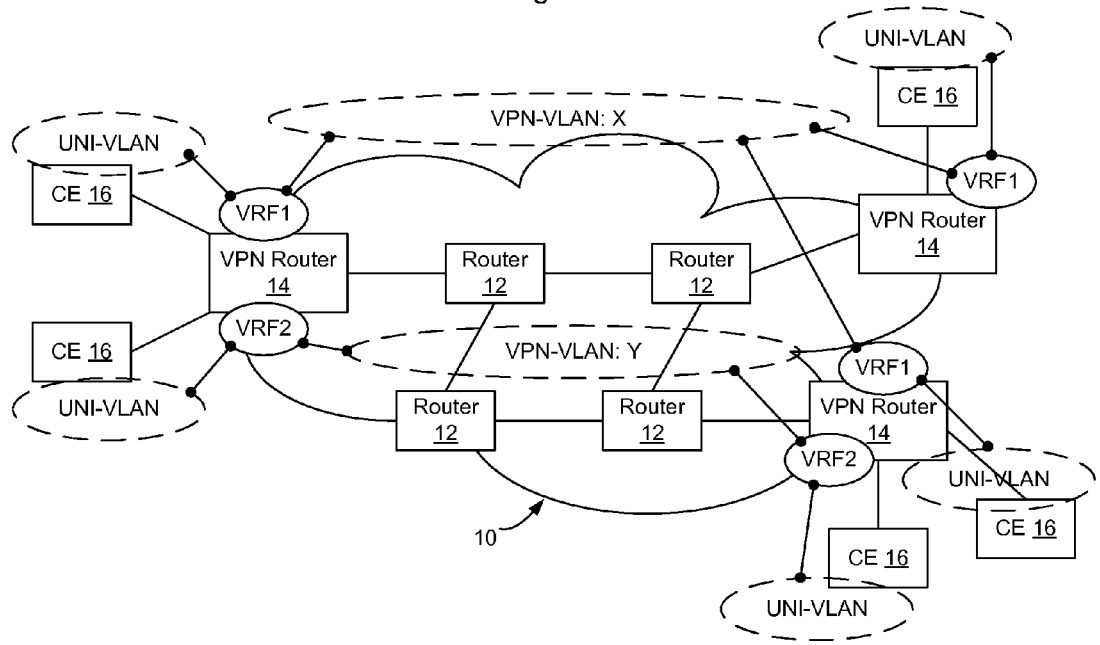
FIG. 2 is a functional block diagram of the network of FIG. 1 showing the implementation of L2 VPNs on the network according to an embodiment of the invention.

FIG. 1 shows an example reference network 10 including a plurality of routers 12 and a plurality of VPN routers 14. The VPN routers support VRFs associated with VPNs on the network. The VPN routers, in one embodiment, are implemented as normal PE devices in the IETF RFC 4364/2547 context. However, the PE devices exchange VPN-VLAN IDs that will be used to establish L2 VPNs on the communication network so that the network may be virtualized to create a VPN VLAN across the network. For example, as shown in FIG. 2, the nodes supporting VRF 1 may be associated with a first VPN-VLAN X, and the nodes supporting VRF 2 may be associated with a second VPN-VLAN Y. The VPN-VLAN IDs are used as import/export route targets by the VRFs to control dissemination of route information at layer 2 of the 7 layer OSI network reference model. This enables the network links that extend over the IP core to be treated as normal VLAN links, so that frames addressed to unknown MAC addresses can be flooded over the VLAN and to enable MAC learning to occur on those ports. Thus, normal L2 behavior may occur within the VPN-VLAN on the network.

In FIG. 2, each VRF has been shown as being associated with a particular VPN-VLAN. The invention is not limited in this manner as a particular VRF may connect to multiple VPN-VLANs. Likewise, in FIG. 2 each VRF is shown as connecting to one particular UNI-VLAN associated with a particular CE. A CE may support multiple UNI-VLANs, and multiple UNI-VLANs may be connected to a given VRF. A UNI-VLAN therefore, is a subset of a VRF such that the VRF can have multiple UNI-VLANs. Each of the UNI-VLANs can be attached to a particular VPN-VLAN. The VRF forms an association between UNI-VLAN and VPN-VLAN that enables the UNI-VLAN to extend across the routed network. FIG. 2 was drawn to show a simplified example and, in operation, it may be expected that much more complicated interconnections between UNI-VLANs and VPN-VLANS may be developed.

FIG. 2 shows the reference network of FIG. 1 in which two VPN-VLANs have been established on the network. As shown in FIG. 2, VRF:1 on VPN router 14A, VRF2 on VPN router 14B, and VRF:3 on VPN router 14C have all become part of VPN-VLAN:X. Similarly, VRF:4 on VPN-VLAN router 14A and VRF:5 on VPN-VLAN router 14C have become part of VPN-VLAN Y. The manner in which the VRFs attach to the VPN-VLAN and the manner in which traffic is handled by the VRFs to enable the VPN-VLAN to operate as a layer 2 VPN will be described below in greater detail in connection with FIG. 3.

Figure 3:
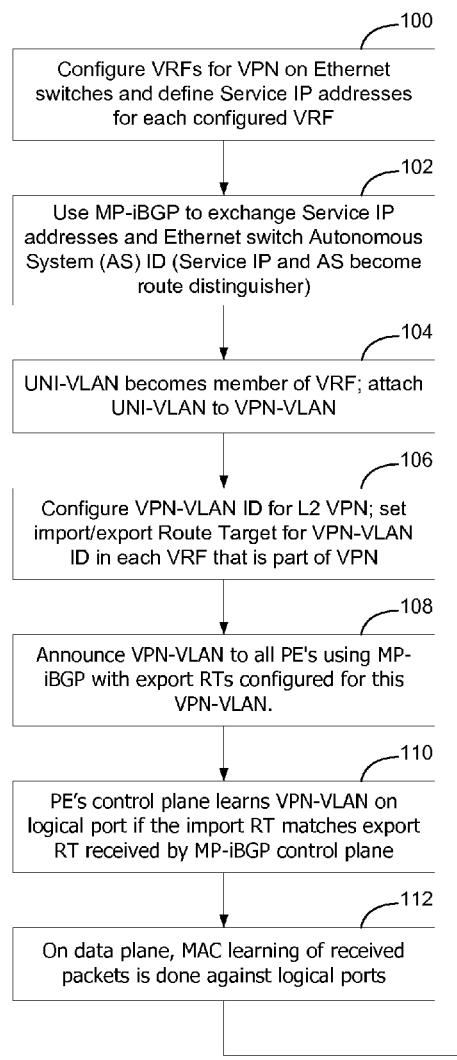
FIG. 3 is a flow chart illustrating a process that may be used to implement a L2 VPN on an IP network according to an embodiment of the invention.
Figure 3:
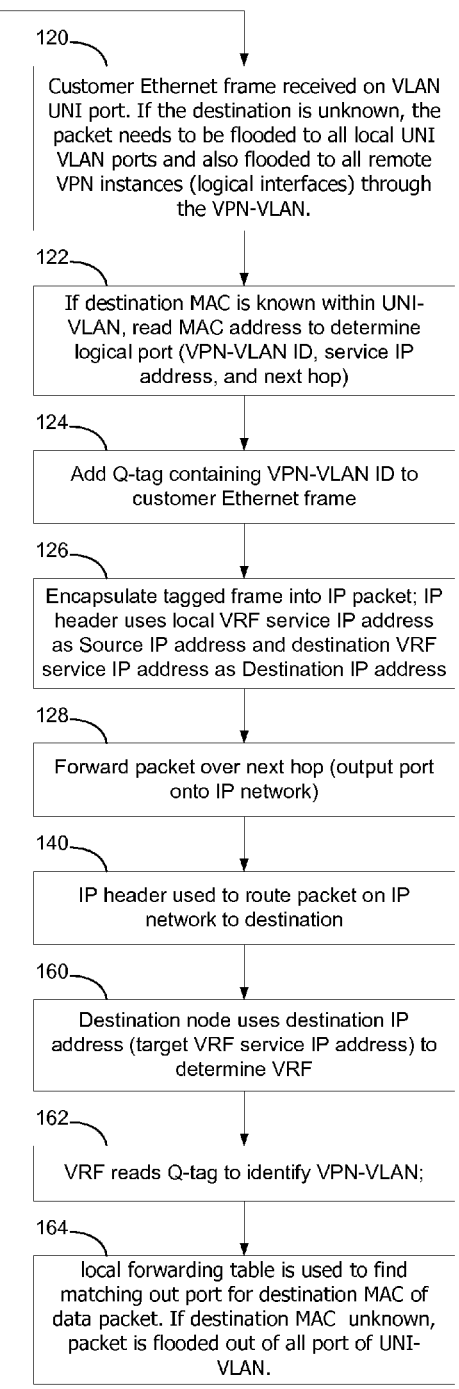

FIG. 3 shows an example process that may be used to implement an embodiment of the invention. As shown in FIG. 3, if an L2 VPN is to be established on the network, VRFs for the VPN will need to be configured on the Ethernet switches (Provider Edge or PE) network elements (100). Configuring the VRFs for the VPN may be implemented using IETF RFC 4364/2547. Additionally, to enable the traffic to be transported on an IP network, service IP addresses will be defined for each VRF configured to operate on the VPN. As described in U.S. patent application Ser. No. 11/935,563, filed Nov. 6, 2007, entitled "Supporting BGP Based IP-VPN in a Routed Network", the service IP addresses enable IP headers to be created so that traffic on the VPN may be encapsulated for transportation on the IP network. This related patent has many additional details associated with how the IP aspect of the VPN should be implemented. The content of this application is hereby incorporated herein by reference.

Once the VRFs have been configured for the VPN, MP-BGP will be used to exchange service IP addresses and Ethernet switch Autonomous System IDs (AS-IDs) (102). The Service IP address and AS-IDs will become route distinguishers which will enable the destination node to determine the target VRF when a packet is received from the IP network. When L2VPN is enabled in the PE device, MP-BGP peers will exchange the capabilities to offer a L2VPN across the core network. When the UNI-VLAN is associated with a VPN-VLAN and VPN-VLAN is associated with route target, MP-BGP will update its peers with VPN-VLAN id and the export route targets. This process accomplishes the auto-discovery of the L2VPNs. Although MP-iBGP is discussed in particular locations, MP-eBGP (MultiProtocol Exterior Border Gateway Protocol) may be used as well.

When a User to Network Interface (UNI) VLAN becomes a member of the VRF, the UNI-VLAN will be attached to the VPN-VLAN (104). As part of configuring the VPN-VLAN on the network, a VPN-VLAN ID will be assigned to the L2 VPN, and import/export Route Targets (RT) will be set for the VPN-VLAN ID in each VRF that is part of the VPN (106). Each VRF that has an export route target set for the VPN VLAN ID will announce the VPN-VLAN ID using MP-iBGP (108). The control plane of each PE will thus learn the VPN-VLAN on a logical port if the import RT of a VRF on the PE matches the export RT of the announced VPN-VLAN ID (110).

Once the control plane has announced the VPN-VLAN so that each PE can learn the MAC addresses of the VPN-VLAN ID against its logical ports, each PE will perform normal MAC learning for the VPN against the physical and logical port so that traffic may be transported on the layer 2 VPN-VLAN (112).

If a customer Ethernet frame is received on a VLAN UNI port, the PE will attempt to forward the Ethernet frame on the VLAN toward its destination using normal L2 forwarding techniques. Thus, if the destination is unknown, the PE will flood the packet to all local UNI VLAN ports and also flood the packet to all logical VPN ports associated with the UNI-VLAN. Specifically, the packet will also be flooded to all remote VPN instances (logical interfaces) that are participating in the VPN-VLAN through the VPN-VLAN (120). Likewise, if the destination MAC address is known within the UNI-VLAN, the MAC address will be read to determine the local UNI port or logical port over which the frame should be forwarded.

If the packet is required to be flooded or forwarded on a logical port, the PE will read the VPN-VLAN ID, the service IP address of the target VRF, and the next hop (122). The FDB will thus store all of this information for the logical port, so that packets may be flooded/forwarded over the logical port on the VPN-VLAN.

Before the frame is forwarded toward the next hop, the PE will add a Q-Tag containing the VPN-VLAN ID (124). This Q-tag will be added to the customer Ethernet frame using IEEE 802.1Q if the customer frame is currently untagged. If the customer Ethernet frame is already tagged, the customer tag may be replaced with the Q-tag or the Q-tag may be added to the customer Ethernet frame using IEEE 802.1 ad. Where the packet is to be transported on an IP network, the customer frame will be further encapsulated into an IP packet (126). The encapsulation process will create the IP header by using the target VRF service IP address as the destination IP address and will use the service IP address of the source VRF as the source IP address. Thus, the VPN-VLAN ID will be used to add a Q-tag to the frame, the service IP address will be used to IP encapsulate the frame, and the next hop will be used to determine the actual physical port over which the IP encapsulated/Q-tagged frame should be forwarded.

For multipoint VPNs, if the packet is to be multicast or broadcast on the network, the packet may be unicast multiple times by using the service IP address of the remote VRFs to send the packet individually to each remote PE which is a member of the VPN or, if the IP network supports multicast IP, a multicast IP address may be used to forward the IP packet on the network. The multicast IP address may be a multicast service IP group address representing the IPVPN of VRFs.

The encapsulated and tagged packet will then be forwarded out the next hop (output port) onto the IP network (128). The outer IP header will be used to route the packet on the IP network toward its destination (140) in a normal manner. Note that no modification to the IP network is required—the packet at this point looks like a normal IP packet which may be handed by the IP routers in a normal manner like any other IP packet. In connection with this, since the packet is being encapsulated to include an additional IP header, the overall size of the packet should be checked to ensure that the encapsulated packet does not exceed the maximum transmission unit size on the IP network.

Once the packet arrives at the destination PE, the destination PE will use the destination IP address to determine the target VRF (160). As mentioned above, the service IP address of the target VRF is used by the sending PE as the destination IP address when encapsulating the frame for transport on the IP network. Accordingly, when the packet is received, the destination PE can read the destination IP address and use the destination IP address to determine the target VRF which should be used to process the packet.

When the target VRF receives the packet, it will read the Q-tag to identify the VPN-VLAN (162). The target VRF will perform local MAC learning on the logical port associated with the VPN-VLAN as noted above. Additionally, the target VRF will perform normal layer 2 forwarding to forward the frame onto the client VLAN. Specifically, a local forwarding table will be used to find a matching output port for the destination MAC address (164). If the destination MAC address is unknown, the packet will be flooded on all UNI-VLAN ports associated with the VPN-VLAN.

Figure 4:
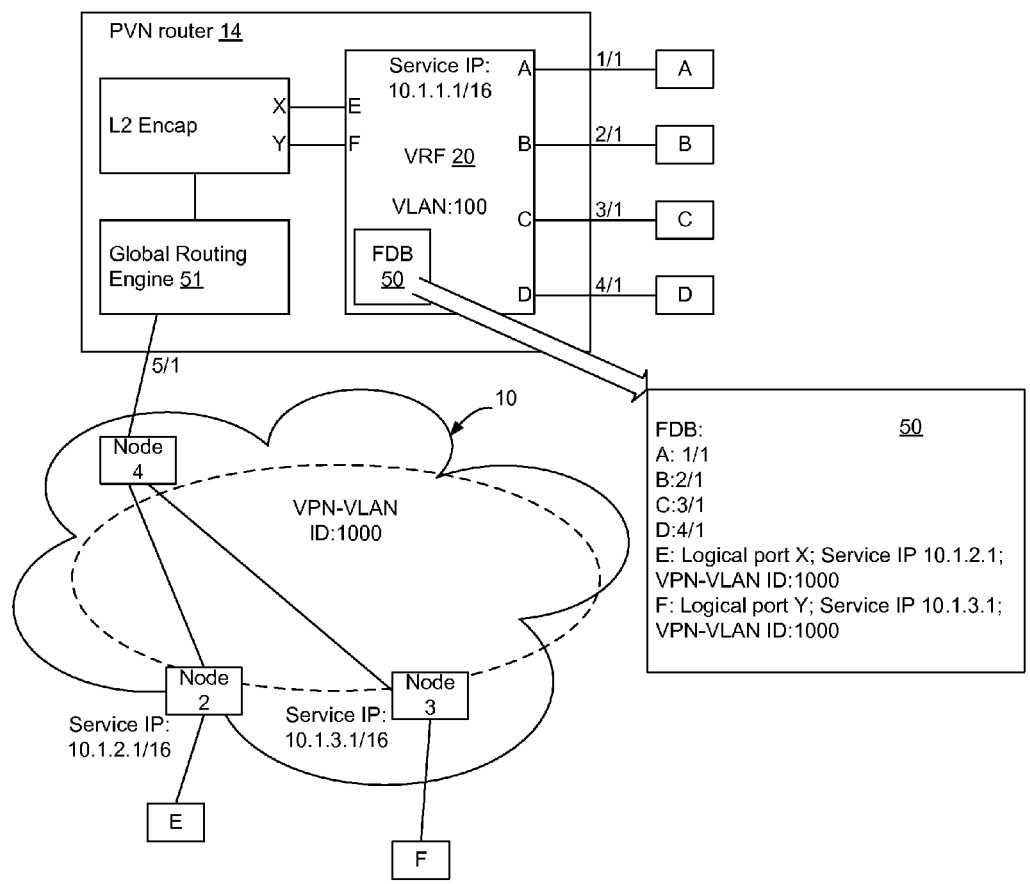
FIG. 4 is a functional block diagram of a portion of the reference network showing one of the PE nodes in greater detail according to an embodiment of the invention.

FIG. 4 shows an example VPN router configured to implement an embodiment of the invention. As shown in FIG. 4, the VPN router 14 has a VRF 20 for VLAN:100. UNI VLAN interfaces on ports 1/1, 1/2, 1/3, and 1/4 have been attached to VLANL:100 and MAC addresses for network elements A, B, C, and D have been learned on these interfaces and stored in Forwarding Database (FDB) 50. Note, in this context, that FDB 50 has an entry for each of MAC addresses A-D with respective entries for the associated physical port. Specifically, the FDB indicates that network element A is reachable on port 1/1, network element B is reachable on port 1/2, network element C is reachable on port 1/3, and network element D is reachable on port 1/4.

In this example, it will be assumed that nodes 2 and 3 also are participating in VLAN:100 and have UNI VLAN interfaces to network elements E and F. To enable a L2 VLAN to extend across IP network 10, during configuration a VPN VLAN will be configured, which will be assigned a VPN-VLAN ID. In this example, the VPN-VLAN ID assigned to the VLAN is VPN-VLAN ID:1000, (but it can be any valid VLAN ID.).

VPN router 14 will use MAC learning to learn network element E on logical port X which is configured on physical port 5/1. Likewise, network element F will be learned on logical port Y which is also configured on physical port 5/1. The logical ports X and Y are separate even though they are configured on the same physical port 5/1 since they lead to different VRFs on different network elements and, hence, different service IP addresses will need to be used to IP encapsulate traffic to reach these nodes on the IP network. In this example, logical port X connects to a VRF on node 2 while logical port Y connects to a VRF on node 3.

Within the VRF FDB 50, the entry for the MAC address of network element E points to logical port X. This entry includes VPN-VLAN ID:1000 which identifies the VPN-VLAN on the network and the service IP address (10.1.2.1) of the VRF on node 2 associated with VLAN:100. Likewise, the FDB entry for network element F points to logical port Y. This entry also includes the same VPN-VLAN ID:1000 which identifies the VPN-VLAN on the network and the service IP address (10.1.3.1) of the VRF on node 3 associated with VLAN:100.

The VRF will perform normal MAC learning on the logical ports as well as on its physical ports. As UNI-VLANs are registered on a physical port on the VPN router, the VRF will register the UNI-VLAN against the port and perform MAC learning within the VLAN 100 on that port to learn MAC addresses of hosts that are reachable over that physical port. Similarly, as other VRFs register with the VRF 20 via VPN-VLAN 1000, the VRF 20 will register the VRFs against a logical port (which includes the service IP address and VPN-VLAN ID), and then perform MAC learning against the logical port to learn MAC addresses of hosts that are reachable over the logical port.

When a client frame is to be transmitted to an unknown MAC address, the client frame will be broadcast on all ports other than the port on which the client frame was received that are associated with the VLAN. Thus, the VRF will broadcast the frame on both the physical ports as well as with the logical ports so that the frame will be transmitted over the VPN-VLAN to the other VPN sites on the layer 2 VLAN. If the MAC address is a known address, the output port will be determined from the forwarding database and used by the VRF to forward the client frame toward its intended destination. If the output port is a logical port, the VRF will obtain the logical port information for the frame from the forwarding database. As noted above, the logical port information in one embodiment includes the VPN-VLAN ID and the service IP address of the target VRF. The VPN-VLAN ID will be used by Layer 2 Encapsulation process to add a Q-tag to the client frame. The VPN router will also create an IP header for the packet using the target VRF service IP address as the destination IP address and the service IP address of the VRF (10.1.1.1) as the source IP address. After encapsulating the packet with the IP header, the packet will be sent to a global routing process 51 which will use the service IP address to determine the physical port to be used to transmit the packet onto the IP network.

Within the IP network the IP header will be used to forward the client frame towards its intended destination. Upon receipt at the target node, the destination IP address of the IP header will be used to identify the target VRF. The Target VRF will read the VPN-VLAN ID from the Q-tag to identify the forwarding database associated with the VLAN. The MAC address will then be used within the forwarding database to determine where the target VRF should send the frame.

Figure 5:
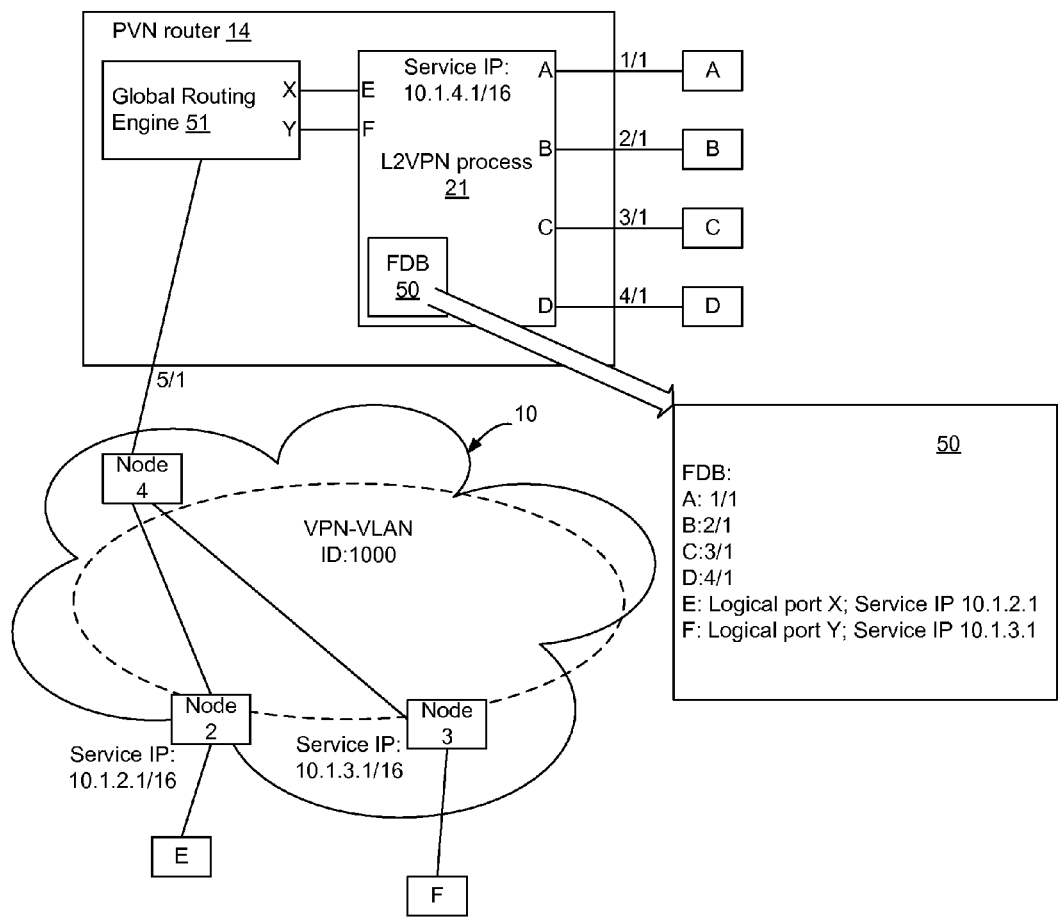
FIG. 5 is a functional block diagram of a portion of the reference network showing one of the PE nodes in greater detail according to another embodiment of the invention.

In another embodiment, shown in FIG. 5, a service IP address is configured on behalf of each L2VPN to be supported by a PE. In this embodiment, rather than assigning a VLAN VPN ID to each L2VPN, a separate service IP address is assigned to each L2VPN by the PE. The global routing engine 51 represents the L2VPN into the core using the service IP address assigned to the L2VPN. One UNI VLAN will attach to a L2VPN process within the PE and packets to be transmitted on the L2VPN will be encapsulated using the service IP address assigned to the L2VPN. If more than one UNI VLAN attaches to the L2VPN at a particular PE, the UNI-VLANs may be disambiguated using Q-tags (VPN-VLAN IDs) as discussed above.

In this embodiment, when a packet is received by the global routing engine, the global routing engine will read the service IP address and use the service IP address to determine the L2VPN process that should be used to process the packet. The packet will be passed to the L2VPN process and switched in the context of the L2VPN process to the correct UNI-VLAN port.

In the other direction, when a packet is received from the UNI-VLAN, the L2VPN process will use the MAC address to determine the correct output port to be used to forward the packet. As shown in FIG. 5, the L2VPN will maintain a forwarding table and, when a packet is received, will perform a MAC lookup to determine how to switch the packet. If the MAC address is unknown, the L2VPN process will flood the packet on both the logical ports associated with the L2VPN and physical ports associated with the attached UNI-VLAN (other than the port on which the packet was received). If the MAC is known, the L2VPN will forward the packet out the port on which the MAC is known.

The L2VPN process will perform MAC learning on both the logical ports and the UNI-VLAN. In this embodiment, rather than learning the MAC with its remote service IP and VPN-VLAN ID on a logical port, the L2VPN process will only learn the remote MAC with it's Service IP address on the logical port. When a packet is required to be transmitted on the logical port, the MAC lookup will return the service IP address to the L2VPN process. The L2VPN process will use the service IP address to encapsulate the packet using the service IP address of the logical port as the destination IP address. The service IP address of the L2VPN process will be used as the source IP address. The Mac-in-IP encapsulated packet will be forwarded to the global routing engine which will use the destination IP address to determine the output port for the packet and transmit the packet onto the IP network.

Using one service IP address per L2VPN enables packets for the L2VPN to be disambiguated by the global routing engine so that, if a packet is received, the destination IP address of the packet may be used by the global routing engine to determine the correct L2VPN process to be used to process the packet. If the L2VPN process represents a single UNI-VLAN, the L2VPN process can switch any packets received over the L2VPN onto the UNI-VLAN. Where the L2VPN process represents more than one UNI-VLAN, packets for the separate UNI-VLANs should be tagged to enable the L2VPN process to determine which UNI-VLAN should be used to forward the packets.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of implementing a Layer 2 (L2) Virtual Private Network Virtual Local Area Network (VPN-VLAN) on a routed network, the method comprising the steps of:
    configuring a Virtual Routing and Forwarding (VRF) process in a network element on the routed network, the VRF process being associated with the VPN-VLAN on the routed network and having a service Internet Protocol (IP) address, the VPN-VLAN having a VPN-VLAN identifier (VPN-VLAN ID) on the routed network;
    learning, by the VRF process, one or more User-to-Network Interface Virtual Local Area Networks (UNI-VLANs) on one or more physical ports of the network element and associating, by the VRF process, the one or more UNI-VLANs with the VPN-VLAN on the routed network;
    learning, by the VRF process, the VPN-VLAN ID on one or more logical ports of the network element, each of the logical ports being associated with a service IP address of another VRF process on another network element on the routed network.

2. The method of claim 1, further comprising the step of performing MAC learning on the one or more logical ports of the network element associated with the VPN-VLAN.

3. The method of claim 2, wherein the step of performing MAC learning on the one or more logical ports of the network element comprises the step of storing MAC addresses learned on the one or more logical ports along with forwarding information for the logical port in a forwarding database, the forwarding information for the logical port including the VPN-VLAN ID and the service IP address of the VRF process associated with the logical port.

4. The method of claim 3, further comprising the steps of receiving a frame to be transmitted on the logical port and receiving, from the forwarding database, the VPN-VLAN ID and service IP address of the logical port to be used to transmit the frame on the routed network.

5. The method of claim 4, further comprising the steps of adding the received VPN-VLAN ID to the frame as a Q-tag and adding an IP header using the received service IP address as a destination IP address.

6. The method of claim 5, wherein when the frame is not tagged with a customer Q-tag, the Q-tag is added as a first tag to the frame.

7. The method of claim 5, wherein when the frame is tagged with a customer Q-tag, the step of adding the VPN-VLAN ID to the frame as the Q-tag comprises replacing the customer Q-tag with the Q-tag containing the VPN-VLAN ID.

8. The method of claim 5, wherein when the frame is tagged with a customer Q-tag, the step of adding the VPN-VLAN ID to the frame as the Q-tag comprises adding another Q-tag to the frame, the added Q tag containing the VPN-VLAN ID.

9. The method of claim 1, further comprising the steps of receiving a frame from the UNI-VLAN on a physical port of the one or more physical ports addressed to an unknown MAC address, and flooding the frame out all other physical ports associated with the UNI-VLAN and out all logical ports associated with the VPN-VLAN.

10. The method of claim 1, further comprising the steps of receiving a frame from the VPN-VLAN on a logical port of the one or more logical ports addressed to an unknown MAC address, and flooding the frame on the one or more UNI-VLANs associated with the VPN-VLAN.

11. The method of claim 1, further comprising receiving an IP packet by the network element, using a destination address in an IP header associated with the IP packet to determine a VRF process to be used to process the IP packet, and reading, by the determined VRF process, a Q-tag associated with the IP packet to determine a VPN-VLAN associated with the packet.

12. The method of claim 1, wherein the step of configuring the VRF process comprises setting an import/export Route Target (RT) for the VPN-VLAN ID in the VRF process.

13. The method of claim 12, further comprising the step of announcing, using MultiProtocol Border Gateway Protocol (MP-BGP), the VPN-VLAN to all Provider Edge (PE) network elements that have an export RT configured for the VPN-VLAN.

14. The method of claim 12, further comprising the step of receiving a MultiProtocol Border Gateway Protocol (MP-BGP) control message and learning the VPN-VLAN on a logical port if an import RT on the logical port matches an export RT in the MP-BGP control message.

15. A method of processing a frame for transmission on an Internet Protocol (IP) network by a Provider Edge (PE) network element, the method including the steps of:
    receiving, by the PE network element, a frame from a User to Network Interface Virtual Local Area Network (UNI-VLAN), the UNI-VLAN being associated with a Layer 2 Virtual Private Network Virtual Local Area Network (VPN-VLAN) spanning the IP network;
    tagging the frame with a Q-tag containing a VPN-VLAN Identifier (VPN-VLAN ID) of the VPN-VLAN on the IP network;
    encapsulating the frame with an IP header containing, as a destination address, a service IP address of a Virtual Routing and Forwarding (VRF) process on a remote Provider Edge (PE) network element on the IP network; and
    transmitting the tagged and encapsulated frame onto the IP network.

16. A method of claim 15, wherein the PE network element has a VRF process instantiated therein.

17. A method of processing a frame for transmission on an Internet Protocol (IP) network by a Provider Edge (PE) network element, the method including the steps of:
- receiving, by the PE network element, a frame from a User to Network Interface Virtual Local Area Network (UNI-VLAN), the UNI-VLAN being associated with a Layer 2 Virtual Private Network (L2VPN) spanning the IP network, the PE network element including a L2VPN process to be used to process frames associated with the L2VPN, the L2VPN process being represented into the IP network via a first service IP address;
- determining a logical port of the PE network element associated with the received frame, the logical port including a second service IP address of a L2VPN process on a remote PE network element;
- IP encapsulating the frame with an IP header, the IP header containing the first service IP address as the source IP address and the second service IP address as the destination IP address; and
- transmitting the IP encapsulated frame onto the IP network.

18. The method of claim 17, further comprising the steps of:
- receiving, by the PE network element, a second IP encapsulated frame having a second IP header, the second IP header including a second destination IP address;
- reading the second destination IP address to determine a local L2VPN process on the PE network element; and
- passing the frame to the determined local L2VPN process to enable the frame to be switched in the context of the determined local L2VPN process.

19. The method of claim 18, wherein the second IP header includes a second IP source address, the method further comprising the step of performing MAC learning against the second IP source address to learn a MAC address of an inner L2 packet.

* * * * *